(12) United States Patent
Krebs et al.

(10) Patent No.: US 11,481,306 B2
(45) Date of Patent: *Oct. 25, 2022

(54) METHODS AND SYSTEMS FOR ESTIMATING PROCESS CAPACITY

(71) Applicant: More Cowbell Unlimited, Inc, Lake Oswego, OR (US)

(72) Inventors: Werner G. Krebs, Chicago, IL (US); John W. Bicknell, Lake Oswego, OR (US)

(73) Assignee: More Cowbell Unlimited, Inc, Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,663

(22) Filed: Oct. 12, 2020

(65) Prior Publication Data

US 2021/0026753 A1 Jan. 28, 2021

Related U.S. Application Data

(63) Continuation of application No. 16/402,071, filed on May 2, 2019, now Pat. No. 10,846,194.

(51) Int. Cl.
| | |
|---|---|
| G06F 11/34 | (2006.01) |
| G06F 11/30 | (2006.01) |
| G06F 11/32 | (2006.01) |
| G06N 20/00 | (2019.01) |
| H04L 51/02 | (2022.01) |
| G08B 21/18 | (2006.01) |
| G06Q 10/06 | (2012.01) |

(52) U.S. Cl.
CPC ...... *G06F 11/3442* (2013.01); *G06F 11/3006* (2013.01); *G06F 11/327* (2013.01); *G06F 11/3476* (2013.01); *G06N 20/00* (2019.01); *G08B 21/182* (2013.01); *H04L 51/02* (2013.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 7,272,613 | B2 * | 9/2007 | Sim ........................ | G06F 16/10 707/999.102 |
| 8,086,462 | B1 * | 12/2011 | Alonso .................. | G06Q 30/02 704/270.1 |
| 9,801,562 | B1 * | 10/2017 | Host-Madsen ........ | A61B 5/316 |
| 10,397,043 | B2 * | 8/2019 | Tapia ..................... | H04L 41/16 |

(Continued)

*Primary Examiner* — Fekadeselassie Girma
(74) *Attorney, Agent, or Firm* — McCoy Russell LLP

(57) ABSTRACT

Systems and methods for estimating capacity in an operational process are provided. In one embodiment, a method comprises collecting event logs from monitoring systems communicatively coupled to a computing device, each event log indicating an event occurring at a given time at a given activity within a process, measuring transition times between activities of the process from the event logs, calculating a capacity of an activity of the activities from the measured transition times, and generating an alert indicating the activity approaching or at a maximum capacity of the activity responsive to the capacity above a threshold. In this way, aspects of a process such as an operational process in need of attention may be rapidly identified and actions for resolution may be automatically recommended.

18 Claims, 10 Drawing Sheets

(56) References Cited

U.S. PATENT DOCUMENTS

| | | | |
|---|---|---|---|
| 10,530,974 B2* | 1/2020 | Kraz | H04R 1/023 |
| 10,846,194 B1* | 11/2020 | Krebs | G06F 11/3006 |
| 11,190,516 B1* | 11/2021 | Loladia | H04L 63/0876 |
| 11,190,535 B2* | 11/2021 | Krebs | G06N 7/005 |
| 11,233,696 B1* | 1/2022 | Kumar | H04L 41/0803 |
| 2007/0276600 A1 | 11/2007 | King et al. | |
| 2015/0243155 A1* | 8/2015 | Xiong | G08B 21/182 |
| | | | 398/135 |
| 2015/0288622 A1* | 10/2015 | Fargano | H04L 12/4641 |
| | | | 370/401 |
| 2017/0031741 A1* | 2/2017 | Seigel | G06F 11/0709 |
| 2017/0374036 A1* | 12/2017 | Ross | A61B 5/021 |
| 2018/0239658 A1* | 8/2018 | Whitner | G06F 11/3409 |
| 2018/0253373 A1* | 9/2018 | Mathur | G06F 11/3664 |
| 2019/0361934 A1* | 11/2019 | Rogynskyy | H04L 67/125 |
| 2020/0013492 A1* | 1/2020 | Ansari | H04L 63/083 |
| 2020/0226416 A1* | 7/2020 | Bapat | G08B 13/1966 |
| 2020/0226903 A1* | 7/2020 | Lewis | G08B 21/22 |

* cited by examiner

|  | Analyze Defect | Archive Repair | Inform User | Register | Repair (Complex) | Repair (Simple) | Restart Repair | Test Repair |
|---|---|---|---|---|---|---|---|---|
| Analyze Defect | 0.20 |  |  |  |  |  |  |  |
| Archive Repair |  | 0.00 |  |  |  |  |  |  |
| Inform User |  |  | 0.00 |  |  |  |  |  |
| Register |  |  |  |  |  |  |  |  |
| Repair (Complex) |  |  |  |  | 0.19 |  |  |  |
| Repair (Simple) |  |  |  |  |  | 0.15 |  |  |
| Restart Repair |  |  |  |  |  |  | 0.00 |  |
| Test Repair |  |  |  |  |  |  |  | 0.23 |

FIG. 11

|  | Call Outbound | Email Outbound | Handle Case | Handle Email | Inbound Call | Inbound Email |
|---|---|---|---|---|---|---|
| Call Outbound |  | extreme value | log normal | log normal | leptokurtic normal | log normal |
| Email Outbound | log normal |  | log normal | extreme value | log normal | log normal |
| Handle Case | log normal | log normal |  | log normal | leptokurtic normal | platykurtic normal |
| Handle Email | log normal | extreme value | log normal |  | log normal | log normal |
| Inbound Call | log normal | log normal | log normal | log normal |  | platykurtic normal |
| Inbound Email | platykurtic normal | normal | normal | leptokurtic normal |  |  |

FIG. 12

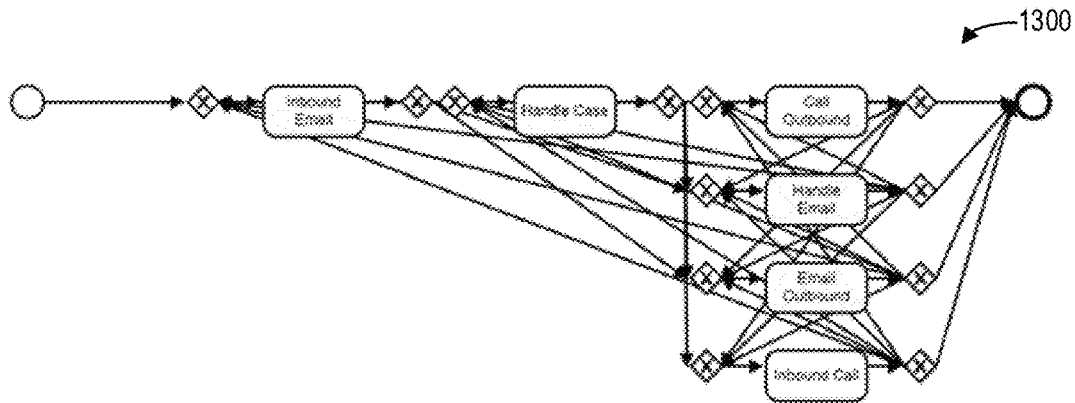

FIG. 13

METHODS AND SYSTEMS FOR ESTIMATING PROCESS CAPACITY

CROSS-REFERENCE TO RELATED APPLICATIONS

The present application is a continuation of U.S. patent application Ser. No. 16/402,071 entitled "Methods And Systems For Estimating Process Capacity," filed on May 2, 2019.

TECHNICAL FIELD

The present disclosure relates generally to the field of process mining, more particularly to process mining of event logs.

BACKGROUND AND SUMMARY

An operational process is a collection of related activities by people or equipment which, when executed in a specific sequence, produces a service or product for an organization, enterprise, customer, or business. Such a process may be visualized as a flowchart or diagram of a sequence of activities with interleaving decision points. Business or operational process management utilizes various methods to discover, model, analyze, measure, improve, and optimize operational processes. Such methods may be used, for example, to identify process bottlenecks, improve production speed, reduce error rates, and identify areas for optimization. Recent advancements in the nascent field of "automated business process management" typically relate to the application of improved machine learning and artificial intelligence techniques to process management. However, such advancements often seem to refer merely to the automation of manual operational processes and continue to require a substantial allocation of time and manual effort. There is therefore a need for methods and systems to provide process improvement and operational process management recommendations with less human input.

The inventors have recognized the above issues and have devised several approaches to address them. The systems and methods provided automatically extract relevant parameters from real and/or simulated operational processes and create and present system recommendations based on an analysis of the relevant parameters. For example, the systems and methods provided may automatically estimate process capacity, display results in a usable format, produce real-time identification of performance bottlenecks, facilitate resource allocation, and adjust processes autonomously. In particular, systems and methods for estimating capacity of an activity in an organizational process are provided. An activity of a workflow or process comprises an object and/or action occurring in the process—for example, each component of a flow chart describing a process or system may be considered an activity.

In one embodiment, a method comprises collecting event logs from monitoring systems communicatively coupled to a computing device, each event log indicating an event occurring at a given time at a given activity within a process, measuring transition times between activities of the process from the event logs, calculating a capacity of an activity of the activities from the measured transition times, and generating an alert indicating the activity approaching or at a maximum capacity of the activity responsive to the capacity above a threshold. In this way, aspects of a process such as an organizational process in need of attention may be rapidly identified. Furthermore, models of the process may be dynamically updated and refined according to the information obtained. Such systems may further be utilized to identify potential areas for improvement, comparing transition times for different users, organizations, operations, or departments and calculating variances between users or different processes. Areas in which there are significant variances may be marked for further investigation or analysis. In some aspects, the system may provide recommendations for minimizing such variances. In additional aspects, areas of variance may be analyzed for economic impact, providing a hierarchical ranking of areas in which changes in resource allocation, re-engineering of processing and labor modifications will provide the biggest impact.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 11 shows a graph illustrating example estimations of capacity from event logs generated by a repair shop according to an embodiment;

FIG. 12 shows a graph illustrating example classifications of statistical distributions measured from event logs generated by a call center according to an embodiment; and FIG. 13 shows an example diagram of a workflow process extracted from event logs generated by a call center according to an embodiment.

DETAILED DESCRIPTION

Figure 8:
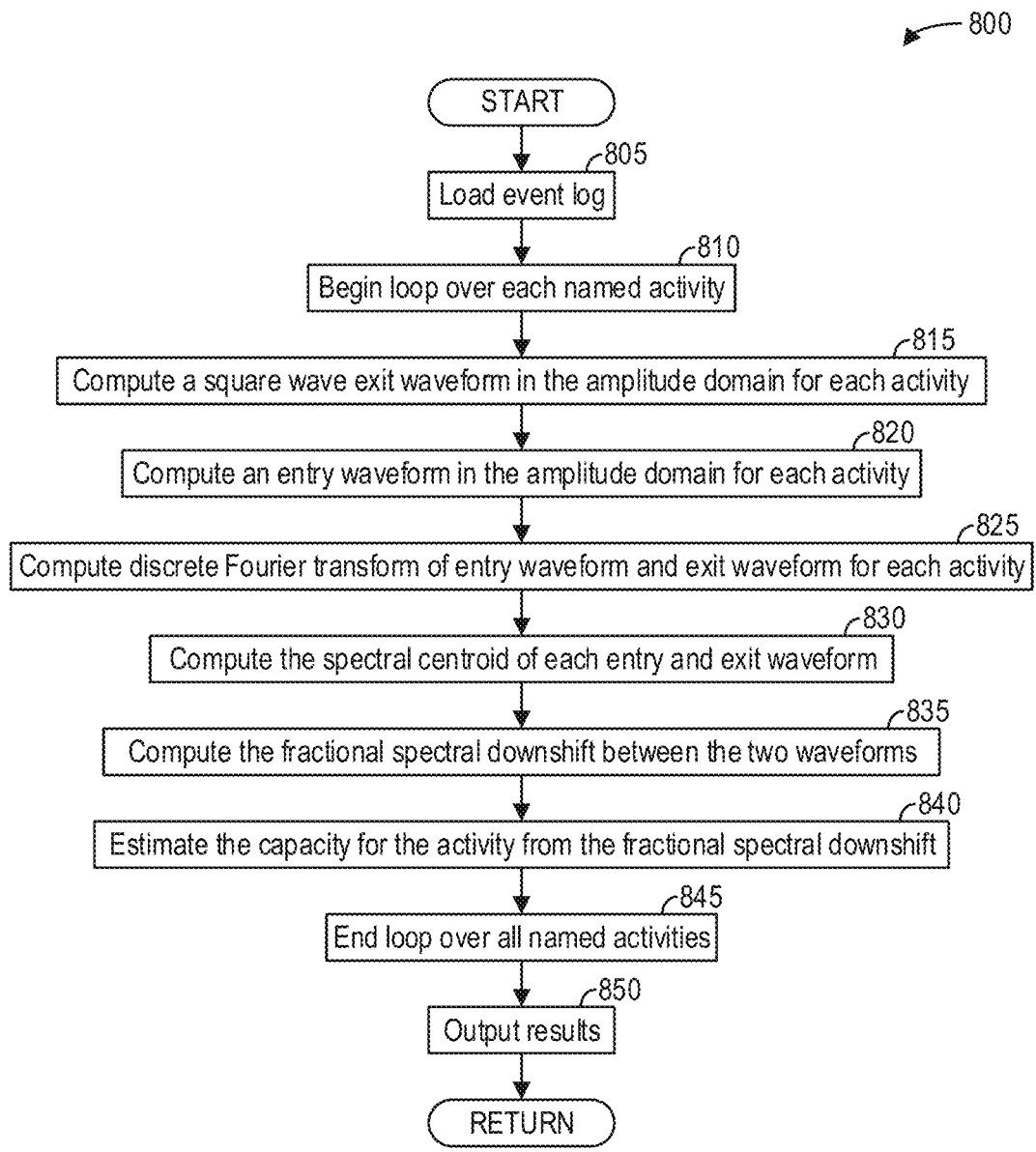
FIG. 8 shows a high-level flow chart illustrating an example method for using Fourier transformations to estimate capacity according to an embodiment.
Figure 9:
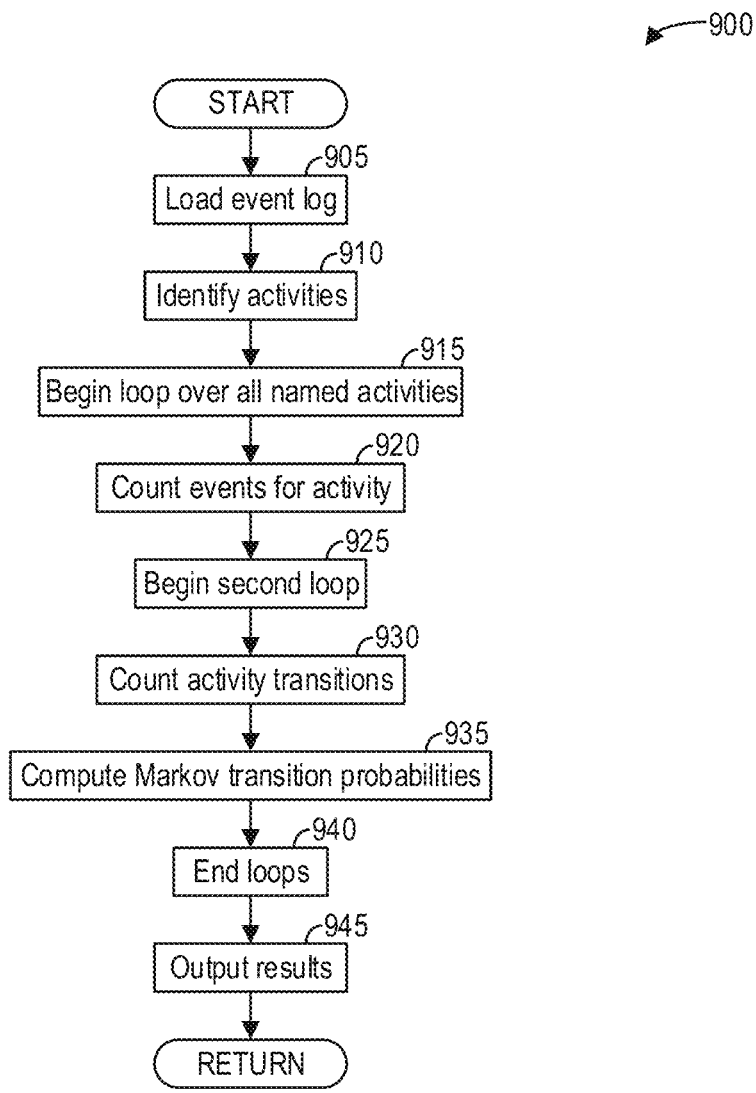
FIG. 9 shows a high-level flow chart illustrating an example method for calculating Markov transitions according to an embodiment.

Described herein are systems and methods for extracting relevant parameters from real and/or simulated operational processes and using the extracted information to develop and present system recommendations. Such information may be used, for example, to identify performance bottlenecks, facilitate resource allocation, and improve processes autonomously. The systems and methods described may utilize a computing environment, such as the computing environment depicted in FIG. 1. For example, the computing environment of FIG. 1 may include a server for rapidly extracting relevant parameters from event logs generated by a plurality of monitored systems configured to monitor various components of a workflow or process and generate event logs describing events. The server may be configured with an event log analysis system, such as depicted in FIG. 2, which may include a module specifically for estimating capacity, as well as additional modules for performing statistical analysis of the event logs and generating optimized output. A method for monitoring event logs, such as the method depicted in FIG. 3, includes estimating the capacity of an activity in a workflow or process from the measurements of transition time in the event logs, and generating alerts for activities with an estimated capacity relative to a threshold. One method for measuring transition times in the event logs, such as the method depicted in FIG. 4, includes performing Fourier analysis of the event logs in a time series representation. A method for initially analyzing event logs, such as the method depicted in FIG. 5, includes identifying activities in an event log and calculating descriptive statistics for the activities as well as for activity transitions. Further, a method for generating recommendations for improving a process or recognizing deficiencies in a process, such as the method depicted in FIG. 6, includes generating graphical diagrams of the process flow from the event logs and leveraging artificial intelligence to provide recommendations for process improvement. A method for estimating capacity of an activity of an operational process, such as the method depicted in FIG. 7, includes computing an estimate of the capacity from average arrival rate and service rate for activities derived from event logs. Another method for estimating capacity of an activity from event logs includes computing fractional spectral downshift in a frequency-domain representation of the event logs, as depicted in FIG. 8. Markov transition probabilities may be computed, as depicted in FIG. 9, for activities in event logs by counting events for the activities as well as activity transitions. A method for generating natural language output or natural language recommendations regarding the event logs, such as the method depicted in FIG. 10, includes generating natural language output based on the analysis of the event logs and modifying or extending the natural language output in instances where at least some activities are operating at or near capacity. An example application of the methods and systems to event logs generated by a repair shop and a call center is depicted in FIGS. 11-13.

Figure 1:
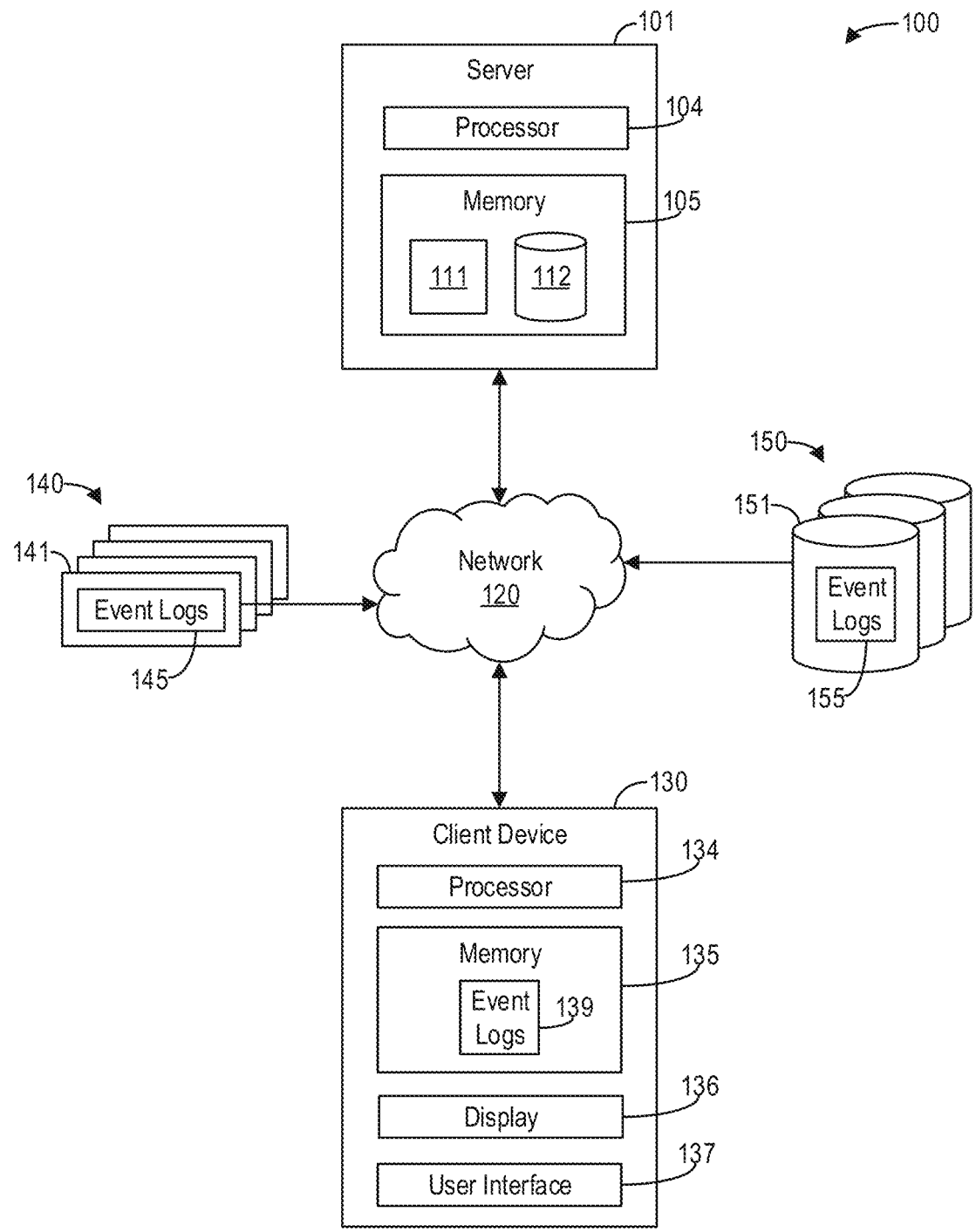
FIG. 1 illustrates an overview of an exemplary computing environment according to an embodiment.
Figure 2:
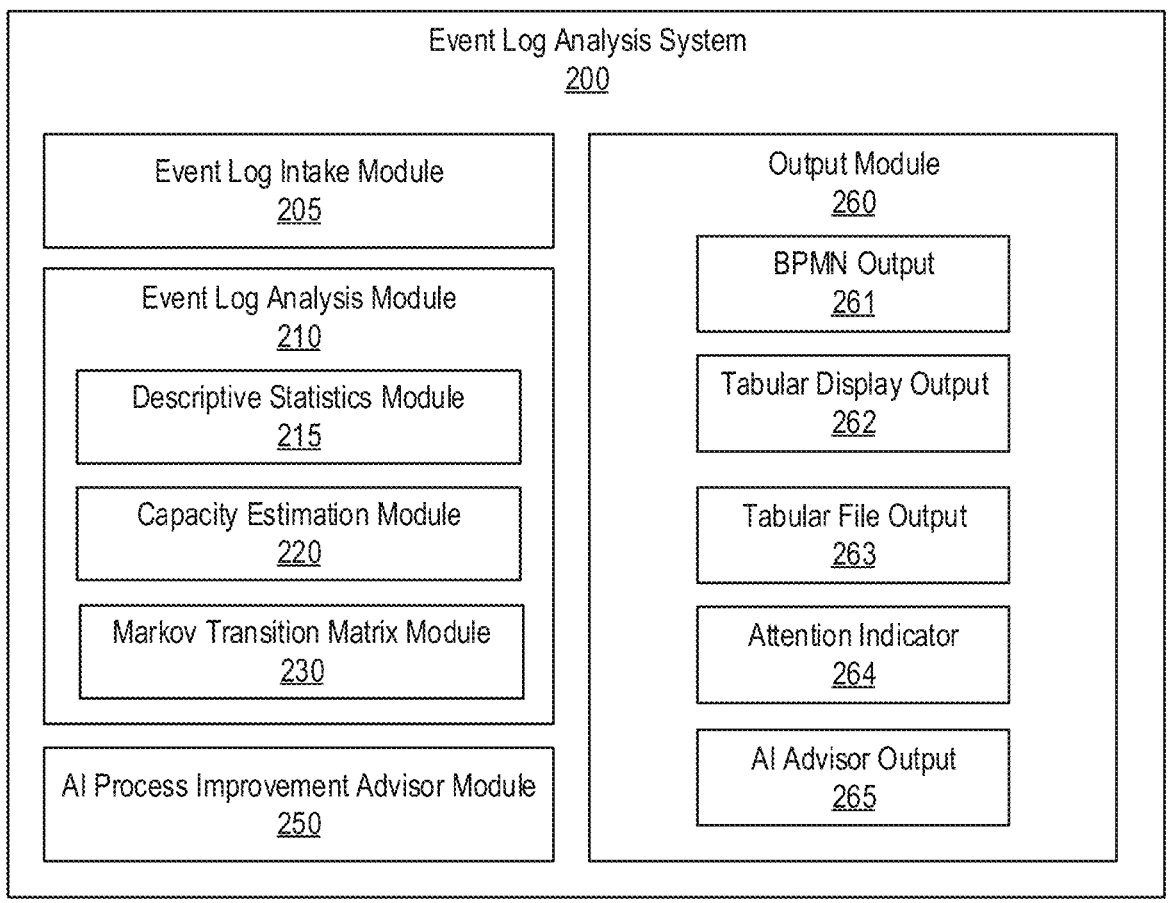
FIG. 2 shows a block diagram illustrating an example architecture for an event log analysis system according to an embodiment.

FIG. 1 illustrates an overview of an exemplary computing environment 100 according to an embodiment. The computing environment 100 includes a server 101, at least one client device 130 communicatively coupled to the server 101 via a network 120, a plurality of monitored systems 140 generating event logs 145, and a plurality of databases 150 storing event logs 155. However, not all of the components illustrated may be required to practice the invention. Further, variations in the arrangement and the type of the components may be made without departing from the spirit or scope of the invention.

Server 101 may be a computing device configured to analyze relevant parameters and using the extracted information to identify problems, develop solutions and/or present system recommendations. For example, server 101 may be configured to estimate process capacity from event logs. In different embodiments, server 101 may take the form of a mainframe computer, a server computer, a desktop computer, a laptop computer, a tablet computer, a network computing device, a mobile computing device, and so on.

Server 101 comprises a logic subsystem such as a processor 104 and a data-holding subsystem such as a memory 105. The server 101 may optionally include a display subsystem, a communication subsystem, a user interface subsystem, and other components not shown in FIG. 1. The processor 104 comprises one or more physical devices configured to execute one or more instructions. For example, processor 104 may execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor 104 may thus include one or more processors configured to execute software instructions. Additionally or alternatively, the processor 104 may comprise one or more hardware or firmware logic machines configured to execute hardware or firmware instructions. Processor 104 may be single or multi-core, and the programs executed thereon may be configured for parallel or distributed processing. The processor 104 may optionally include individual components that are distributed throughout two or more devices, which may be remotely located and/or configured for coordinated processing. Such devices may be connected via network 120. Network 120 may be the Internet or one or more wired or wireless networks (e.g., an Internet Protocol (IP)-based local area network (LAN), metropolitan area network (MAN) wide area network (WAN), a Wireless LAN (WLAN) network such as Wireless Fidelity (WiFi), and/or a cellular telecommunications network such as Global System for Mobile Communications (GSM) network, 3G network, or long term evolution (LTE) network).

Memory 105 of the server 101 may comprise one or more physical, non-transitory devices configured to hold data and/or instructions executable by the processor 104 to implement the methods and processes described herein. When such methods and processes are implemented, the state of the memory 105 may be transformed (for example, to hold different data).

In one example, the server 101 includes an event log analysis system 111 configured as executable instructions in the memory 105. The event log analysis system 111 may analyze a plurality of event logs, as described further herein, to estimate capacity of activities in a process, as well as simulate variations of the process. Event logs and/or the results of the event log analysis may be stored locally, for example, in a data store 112 of the memory 105.

Memory 105 may include removable media and/or built-in devices. Memory 105 may include optical memory (for example, CD, DVD, HD-DVD, Blu-Ray Disc, etc.), and/or magnetic memory devices (e.g., hard drive disk, floppy disk drive, tape drive, MRAM, etc.), and the like. Memory 105 may include devices with one or more of the following characteristics: volatile, non-volatile, dynamic, static, read/write, read-only, random access, sequential access, location addressable, file addressable, and content addressable. In some embodiments, the processor 104 and the memory 105 may be integrated into one or more common devices, such as an application-specific integrated circuit or a system on a chip.

In some examples, the computing environment 100 further comprises a client device 130. The client device 130 may comprise any suitable computing device configured to access a network such as network 120, including but not limited to a personal desktop computer, a laptop computer, a smartphone, a tablet computer, and the like. While one client device 130 is shown, it should be appreciated that any number of client devices operated by respective users may be communicatively coupled to the server 101 via the network 120.

The client device 130 comprises a processor 134, a memory 135, a display system 136, and a user interface 137. Similar to the processor 104 of the server 101, the processor 134 of the client device may include one or more processors configured to execute software instructions. Further, the memory 135 of the client device 130 may include one or more physical, non-transitory devices configured to hold data and/or instructions executable by the processor 134 to implement the methods and processes described herein. Further, in some examples, a plurality of event logs 139 may be stored in the memory 135.

The display system 136 of the client device 130 may be used to present a visual representation of data held by the memory 105. For example, results of the event log analysis performed by the server 101 may be transmitted to the client device and displayed to a user of the client device via the display system 136. The display system 136 may include one or more display devices utilizing virtually any type of display technology such as, but not limited to, CRT, LCD, LED, OLED, ELD, PD, AMOLED, and QD displays. As another example, display system 136 may comprise a display projector device, such as a DLP projector, an LCoS projector, a laser projector, an LED projector. As yet another example, display system 136 may comprise an augmented reality (AR) display system, a virtual reality (VR) display system, or a mixed reality (MR) display system. Such display devices may be combined with the processor 104 and the memory 105 in a shared enclosure, or such display devices may be peripheral display devices.

The user interface 137 of the client system 130 may comprise one or more user input devices such as keyboards, mice, game controllers, cameras, microphones, touch screens, and so on. A user of the client device 130 may input requests or commands, for example, via the user interface 137 for event log analysis, which may be transmitted to the server 101 via the network 120.

Thus, the server 101 and the client device 130 may each represent computing devices which may generally include any device that is configured to perform computation and that is capable of sending and receiving data communications by way of one or more wired and/or wireless communication interfaces. Such devices may be configured to communicate using any of a variety of network protocols. For example, client device 130 may be configured to execute a browser application that employs HTTP to request event log analysis from server 101 and then display retrieved information to a user on a display such as the display system 136.

In some examples, the computing environment 100 further comprises a plurality of monitored systems 140 including at least one monitored system 141 which generates event logs 145. A monitored system 141 of the plurality of monitored systems 140 may comprise, for example, a computing device configured to sense an event and generate an event log describing the event. As an illustrative example, the computing device may be closely coupled with an electronic sensor or an array of sensors for sensing events. The monitored systems 140 may comprise components of an industrial automation or control system, Internet of Things hardware, industrial Internet of Things hardware, cloud computation hardware, computer hardware, and so on, as illustrative examples. Each monitored system 141 of the plurality of monitored systems 140 may thus monitor or sense one or more events relating to a process in a system. Further, the plurality of monitored systems 140 may be communicatively coupled to the server 101 via the network 120, which may comprise a radio network, a radio link, WiFi, LPWAN, LPWA, LPN, mobile telephony (e.g., 3G, 4G, 5G telephony), a computer mesh network, a blockchain, an optical transmission network, Bluetooth, a laser communication network, an Ethernet computer network, an optical communication network, a deep space communication network, a vehicular relay station (e.g., a satellite, drone, and/or balloon) network, and/or similar communication technology.

In some examples, the computing environment 100 further comprises a plurality of databases 150 including at least one database 151 storing event logs 155. The plurality of databases 150 may be communicatively coupled to the server 101 via the network 120, such that the event logs 155 stored in the database 151 may be transmitted to the server 101 for event log analysis.

FIG. 2 shows a block diagram illustrating an example architecture for an event log analysis system 200 according to an embodiment. The event log analysis system 200 may be implemented, as an illustrative example, as instructions 111 in the memory 105 of the server 101. As another illustrative example, one or more components of the event log analysis system 200 may be implemented independently of the server 101 as an electronic hardware or a software mechanism or firmware running on hardware, for example, in a microprocessor system such as an Internet of Things hardware device. In such examples, the event log analysis system 200 may be specially modified to operate in extreme environments, such as an expeditionary battlefield, space craft, space colony, or Antarctic research station, for example by hermetic sealing, shielding or software/hardware countermeasures against cosmic rays (such as error-correcting memory hardware), ultra-high-latency or unidirectional transmission, and through pressurization or temperature control mechanisms.

The event log analysis system 200 comprises one or more of an event log intake module 205, an event log analysis module 210, an artificial intelligence (AI) process improvement advisor module 250, and an output module 260.

The event log intake module 205 comprises an input API for accepting event logs for analysis. To that end, the event log intake module 205 may initially load event logs provided to the event log analysis system 200 and prepare the event logs for analysis. For example, the event log intake module 205 may aggregate, sort, partition, or otherwise prepare a plurality of event logs according to one or more attributes of the event logs. The event log intake module 205 typically accepts the event logs in a standard file format, such as, but not limited to, an eXtensible Event Stream (XES) format, a Comma-Separated Values (CSV) format, and/or another eXtensible Markup Language (XML), and/or tabular format.

Each event log comprises a record of an event, and thus includes at least an identifier (Case ID) identifying a case in the log associated with the event, a start time indicating a date and a time for the event, and an activity corresponding to the event. Event logs thus indicate a current status of a case as well as historical progress of the case over time through a workflow. As used herein, the term "case" refers to the entity being handled by the process that is analyzed. For example, events refer to a process case. Examples of a process case are a customer order, an insurance claim, a loan application, and so on. A process case or case may also be referred to herein as a process instance. As noted above, the identifier or Case ID is a representation of a case, which is unique and thus serves to uniquely identify the case or instance. The Case ID often consists of a combination of letters and numbers, for example.

The event log analysis module 210 uses artificial intelligence or analytics to deduce a workflow of operational processes or other processes from the event logs. For example, the event log analysis module 210 accepts the event logs from the event log intake module 205 and generates a machine-readable two-dimensional process diagram, such as a Business Process Model and Notation (BPMN) diagram, which comprises a graphical representation of a process or processes described by the event logs. Furthermore, the event log analysis module 210 computes Markov transition probabilities by observing activity transitions in the event logs via a Markov transition matrix module 230, calculates a plurality of descriptive statistics (in both linear and log scale) such as mean, median, skew, and kurtosis via a descriptive statistics module 215, and uses heuristics to connect the different states in the two-dimensional machine-readable process diagram. The event log analysis module 210 thus outputs a machine-readable process diagram of the process depicting activities of the process and the interconnection of such activities as identified in the event logs, and descriptive statistics for each activity calculated from measurements derived from the event logs.

In some aspects, the event log analysis module 210 includes a descriptive statistics module 215. The descriptive statistics module 215 calculates a plurality of descriptive statistics (in both linear and log scale) such as mean, median, skew, and kurtosis. The descriptive statistics module 215 further analyzes the statistical distribution of activity transition times to classify the statistics with labels such as "normally distributed," "extreme value distribution," "uniform distribution," "Poisson distribution," "platykurtic normal distribution," and so on, by applying heuristics to the calculated kurtosis, skew, mean, variance, median, and mode. These natural language labels form part of a process diagnostic natural language corpus that is fed into the AI process improvement advisor module 250, as described further herein.

The event log analysis module 210 further comprises a capacity estimation module 220. The capacity estimation module 220 estimates the capacity of each activity in a process. To that end, in some embodiments, the capacity estimation module 220 determines the average transition time for each activity, the total elapsed time for which event observations are being analyzed, the total number of sojourns between the various activities, and the total number of sojourns in the overall aggregate of the activities. A sojourn comprises a path of a case between activities in the operational process, for example, while sojourn time comprises the total time spent in the system. Sojourn time may be measured from the event logs and represents the entire activity wait and activity service times combined. For example, a sojourn for a case may proceed from Activity (N) to Activity (N+1), and so the sojourn time may be calculated according to the Activity (N+1) Start Time minus the Activity (N) Start Time, or alternatively Activity (N) Complete Time minus Activity (N−1) Complete Time, wherein the sojourn proceeds from Activity (N−1) to Activity (N). Further, the total elapsed time comprises a "wall time" that has elapsed from the start of the first event in the event log to the last event in the event log.

In some examples, the capacity estimation module 220 receives measurements of such parameters from the event log analysis module 210. Alternatively, the capacity estimation module 220 may evaluate the capacity of each activity in parallel with the event log analysis of the event log analysis module 210.

The capacity estimation module 220 utilizes a simplified model for a queue to enable rapid estimation of the capacity of each activity in the process. In particular, the utilization $\rho$, also referred to as the capacity parameter $\rho$, for a M/M/1 system is expressed as:

$$\rho = \lambda/\mu,$$

where $\lambda$ comprises the average arrival rate and $\mu$ comprises the service rate such that $1/\mu$ is the average service time. In some examples, the service rate $\mu$ is defined as:

$$\mu = \lambda + 1/\alpha,$$

wherein $\alpha$ comprises the average transition time of events through the activity, or the average throughput. The average arrival rate $\lambda$ may be calculated as the total number of observed events over an observed time. The analytic expression for the capacity parameter $\rho$ provided above is accurate under the assumption that there is only a single worker or single automated process (e.g., a single computing thread) processing events in the workflow. However, the capacity estimation module 220 estimates the capacity parameter $\rho$ according to the above expression regardless of the number of workers or the complexity of a workflow, as the expression provides at least an estimate of capacity or utilization that is often correct in its conclusions.

In some examples, the capacity estimation module 220 may use Fourier analysis to estimate queue capacities. For example, as described further herein with regard to FIG. 4, the capacity estimation module 220 may convert the event logs into a time series, apply a Fourier transformation to the time series, measure shifts in spectral bandwidth before and after task processing, and identify these shifts in spectral bandwidth as the average wait times at the processing point or activity. Further, the capacity estimation module 220 may estimate capacity from the average wait times derived from the spectral analysis. For example, the trajectories of the average wait times or queue lengths may then be analyzed to determine whether an activity is approaching capacity, as the trajectory of queue lengths for an activity approaching capacity may be higher than the trajectory of queue lengths for an activity below capacity. To that end, the capacity estimation module 220 constructs the average wait times or queue lengths as a time series and then transforms (e.g., via a Fourier transformation) the time series representation of the queue lengths from the time domain to the frequency domain. A measure of capacity such as capacity parameter $\rho$ or utilization of the activity may then be estimated from the frequency representation of the queue lengths, for example by computing the fractional spectral downshift between two waveforms or by evaluating Fourier coefficient magnitude values. In this way, the capacity estimation module 220 may estimate capacity of each activity without any assumptions regarding a number of workers for each activity.

In other examples, the capacity estimation module 220 may use Fourier analysis to estimate queue capacities based on spectral centroids of waveforms generated from event logs. For example, as described further herein with regard to FIG. 8, the capacity estimation module 220 may compute square wave waveforms in the amplitude domain for each activity in an event log, including an entry waveform and an exit waveform, transform the waveforms into the frequency domain, compute the spectral centroid of each waveform, compute the fractional spectral downshift between the two waveforms, and estimate the capacity for the activity from the fractional spectral downshift.

As mentioned above, the capacity estimation module 220 may comprise a component of the event log analysis module 210. Alternatively, the capacity estimation module 220 may be a component of the event log analysis system 200 independent of the event log analysis module 210. In such examples, the capacity estimation module 220 is functionally connected to the event log analysis module 210. It should be appreciated that in some examples, the capacity estimation module 220 and the event log analysis module 210 may be implemented in the same hardware or software, while in other examples the capacity estimation module 220 and the event log analysis module 210 may be implemented in separate hardware or software which are configured to communicate.

The event log analysis module 210 may further comprise a Markov transition matrix module 230, which in some examples may instead be functionally connected to the event log analysis module 210, and record subsequently-processed event activity sojourn statistics such as the number of observed activity sojourns, the average time for each sojourn, and the total elapsed time during which sojourns are observed, in Markov transition matrices.

Figure 6:
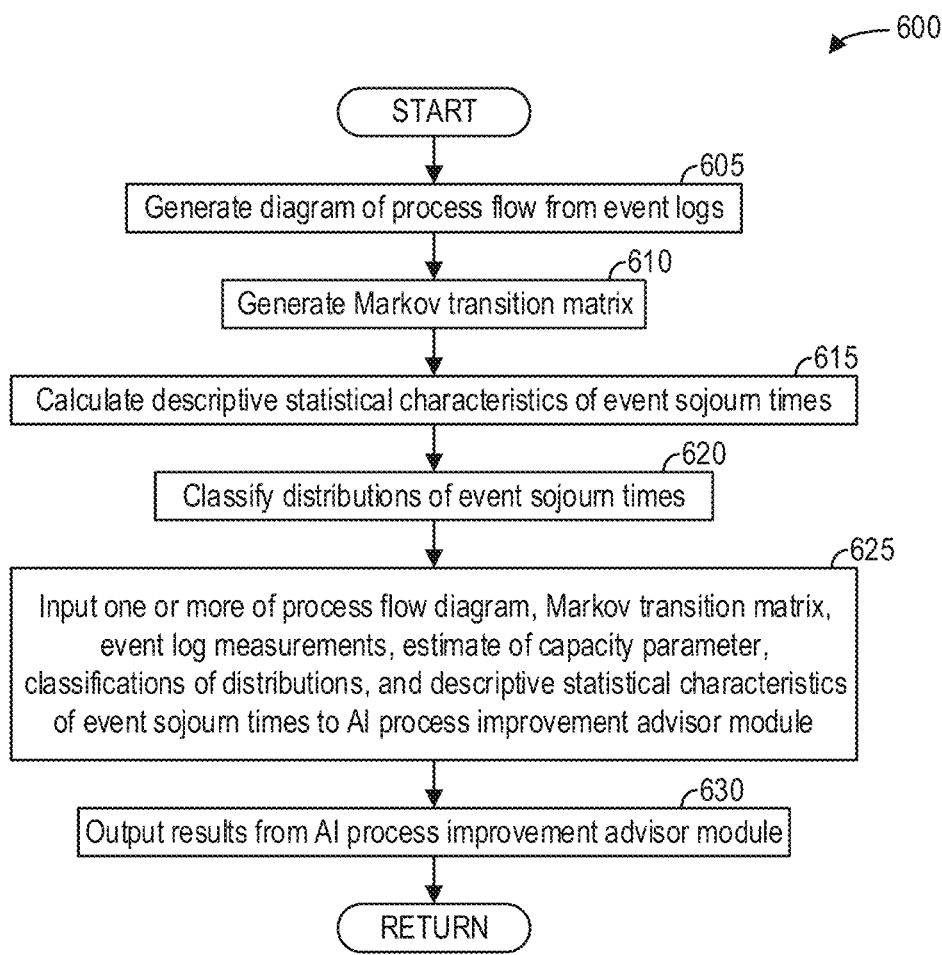
FIG. 6 shows a high-level flow chart illustrating an example method for utilizing data extracted from event logs for automated workflow improvements according to an embodiment.

Thus, the event log analysis module 210 may analyze event logs by processing the event logs with the basic statistics module 215 to determine statistical descriptions of the activities in the event logs as described further herein with regard to FIG. 6. The event log analysis module 210 may further analyze the event logs by processing the event logs with the capacity estimation module 220 to estimate capacity of activities, based on concepts from simple queuing theory as described herein with regard to FIGS. 3 and 7, or based on Fourier transformations of the event logs, as described herein with regard to FIGS. 4 and 8. The event log analysis module 210 may further analyze the event logs by processing the event logs with the Markov transition matrix module 230, as described further herein with regard to FIG. 9. The event log analysis module 210 outputs the results of processing with the basic statistics module 215, the capacity estimation module 220, and the Markov transition matrix module 230 to other modules, including one or more of the AI process improvement advisor module 250 and the output module 260.

The AI process improvement advisor module 250 uses artificial intelligence techniques such as natural language processing to advise a human operator and/or an artificially intelligent operator on how to improve the analyzed processes. For example, the AI process improvement advisor module 250 automatically generates a narrative analysis of the analyzed processes using natural language and select descriptive statistics derived from the processes. The AI advisor output 265 of the AI process improvement advisor module 250 thus includes natural language which describes the process to the user, including capacity challenges.

To that end, the AI process improvement advisor module 250 analyzes the output of the event log analysis module 210 and the capacity estimation module 220, for example via an AI chatbot advisor, to automatically describe the process steps most likely in need of continuous improvement based on the quantitative capacity estimates as well as the output of other modules, alerts when activities exceed specified capacity thresholds, variances between customers and/or processes, non-user-defined variables, an economic overlay, and so on. The AI chatbot advisor of the AI process improvement advisor module 250 may thus be trained with natural language corpuses such as ISO 9001, ISO 27001, Six Sigma, Lean Six Sigma, Total Quality Management, Sociocracy, Value Engineering, Agile, so-called "waterfall" (i.e., traditional frameworks), CMMI, FedRAMP, Military Inspector General (IG) checklists, and/or other continuous process improvement advisory corpuses. Such corpuses or training materials consist of checklists of a minimal yet complete set of questions an internal ISO 9001 auditor (or other framework auditor) should ask a business to determine if the business is potentially ISO 9001 compliant, for example, and effectively offer suggestions for improvement if the business is not yet ISO 9001 compliant.

Such business framework audits are understood to provide significant improvements in business revenue against statistically comparable peer businesses that do not adopt such continuous improvement frameworks. Similar audits may be performed in operational or organizational contexts. However, such audits are typically a highly labor-intensive practice. Therefore, the AI process improvement advisor module 250 enables an automated and highly efficient approach to simulating the role of an ISO 9001 or other business framework auditor, determining the most relevant questions or identifying the most likely business deficiencies, and expressing these questions and/or identifications to a human operator or another artificially intelligent agent in natural language.

In addition or as an alternative to training an AI advisor chatbot of the AI process improvement advisor module 250 with one or more of the natural language corpuses described above, the AI advisor chatbot may be further trained on specific boilerplate natural language text relating to the particular output of the other modules described herein. For example, the AI advisor chatbot may be trained with natural language output generated from the capacity estimation module 220 (e.g., "Activity X appears to be the operational process operating at highest capacity") or from the descriptive statistics generated by the Markov transition matrix module 230 (e.g., "_____% of the time, process transitions flow from Activity X flow to Activity Y") or from the descriptive statistics module 215 (e.g., "There were an average of XX.X events per case, and a median of YY.Y events per case.").

By using text generation algorithms to translate the output of the modules into simple natural language phrases, the AI process improvement advisor module 250 may generate simple yet intelligent, natural language statements which describe the process and about how a process may be improved. As additional examples, such statements generated by the AI process improvement advisor module 250 may include "This [log file name] process takes [X] days on average. The longest process activities are between [Activity A] and [Activity B], which takes [X.X] days on average. The shortest activity is between [Activity J] and [Activity K], which takes [X.X] minutes, on average. There appears to be some re-work happening between [Activity Q] and [Activity R]. Based upon our capacity estimates, this process activity [Activity F] is at [XX]% capacity. We arrive at this conclusion based upon the following observations [. . . ]," wherein variables denoted by square brackets (e.g. [log file name], [X], [Activity A], [Activity B], [X.X], [Activity J], [Activity K], [X.X], [Activity Q], [Activity R], [Activity F], [XX], [. . . ] correspond to data derived from the event logs and/or measurements of parameters from the event logs via one or more of the event log analysis module 210, the descriptive statistics module 215, the capacity estimation module 220, and the Markov transition matrix module 230.

The chat sessions between the AI process improvement advisor module 250 and a user of a client device 130, for example, may be supervised to provide machine-readable feedback from the user to further improve the effectiveness of the AI process improvement advisor module 250.

The output module 260 of the event log analysis system 200 comprises an output API of the event log analysis system 200. The output module 260 facilitates the output of a BPMN output 261 from the event log analysis module 210, a tabular display output 262, a tabular file output 263, an attention indicator 264, and the AI advisor output 265 from the AI process improvement advisor module 250. In some examples, the output module 260 facilitates output of one or more modules to other modules of the event log analysis system 200. For example, the capacity estimations output by the capacity estimation module 220 may be input via the output module 260 to the event log analysis module 210 for sorting the various operational process workflow activities (such as in BPMN file output 261) according to the capacity parameter ρ.

The BPMN output 261 may comprise a modified BPMN-like output file that includes or passes parameters such as average queue wait times, average service time, work and/or operating schedule information, and so on, which are not typically provided with BPMN files. To that end, the BPMN output 261 may be functionally connected to the event log analysis module 210 as well as one or more of the sub-modules therein, including the descriptive statistics module 215, the capacity estimation module 220, and the Markov transition matrix module 230. The BPMN output 261 may be further functionally connected to the AI process improvement advisor module 250.

Further, the attention indicator 264 identifies process and/or workflow activities that are in greatest need of attention (as determined via capacity parameter ρ or by mean or median activity times), such as by color coding, shading, 3D models, and/or animation effects in a BPMN business process diagram and/or other visual diagram. If 3D modeling is employed, the BPMN diagram and associated data may also be converted into various 3D file formats, as known to those skilled in the art of 3D modeling, 3D printing, virtual reality, augmented reality, and computer video gaming. As another example, the attention indicator 264 may be output to a business intelligence dashboard (such as AWS Quicksight, IBM Cognos, JIRA, Microsoft Dynamics 365), to immediately highlight and identify operational processes and/or operational departments that are struggling and/or inefficient as evidenced by capacity issues or mean or median activity times. In some examples, the attention indicator 264 may further suggest remedial steps (such as rejecting some customer orders to reduce capacity issues and/or hiring workers to increase business capacity), for example when combined with the AI advisor output 265.

Further, the attention indicator 264 may be used to sort various process activities, such as in the BPMN output 261, the tabular display output 262, or the tabular file output 263, together with the descriptive labels from the event log input. These mechanisms numerically display or output the quantitative capacity estimations in a format such as a tabular format, together with graphical techniques for highlighting elements in greatest need of attention (as determined by the capacity parameter). The graphical display or output may be in one or more of a variety of formats including, but not limited to, a color-coded heat map, shading, font selection, text style selection, and/or similar techniques. This output permits a user to immediately see which activities in the operational process workflow may be at risk of failure or candidates for optimization. The tabular output format is especially advantageous in an industrial Internet of Things, where the number of activities may be numerically very large and thus overwhelm the typical two-dimensional BPMN process plot (which are often forced to use heuristics to eliminate supposedly irrelevant activities). In the preferred embodiment, the tabular or matrix-style output may also be color-coded (e.g. using a so-called 'heat-map') that analyzes the overall distribution of the output and uses different color-codes to highlight the outliers or those numerical values that are in the extreme or outermost ranges of the output range.

In some optional examples, the attention indicator 264 may be output to a heads-up display, such as for use aboard a spaceship, motorcycle helmet, astronaut space suit, so-called "connected" soldier visor or goggles, aircraft, land vehicle, automobile, tank, lunar rover, Mars rover, Mars transport vehicle, space colony transport vehicle, naval vessel and/or similar vessel.

Figure 3:
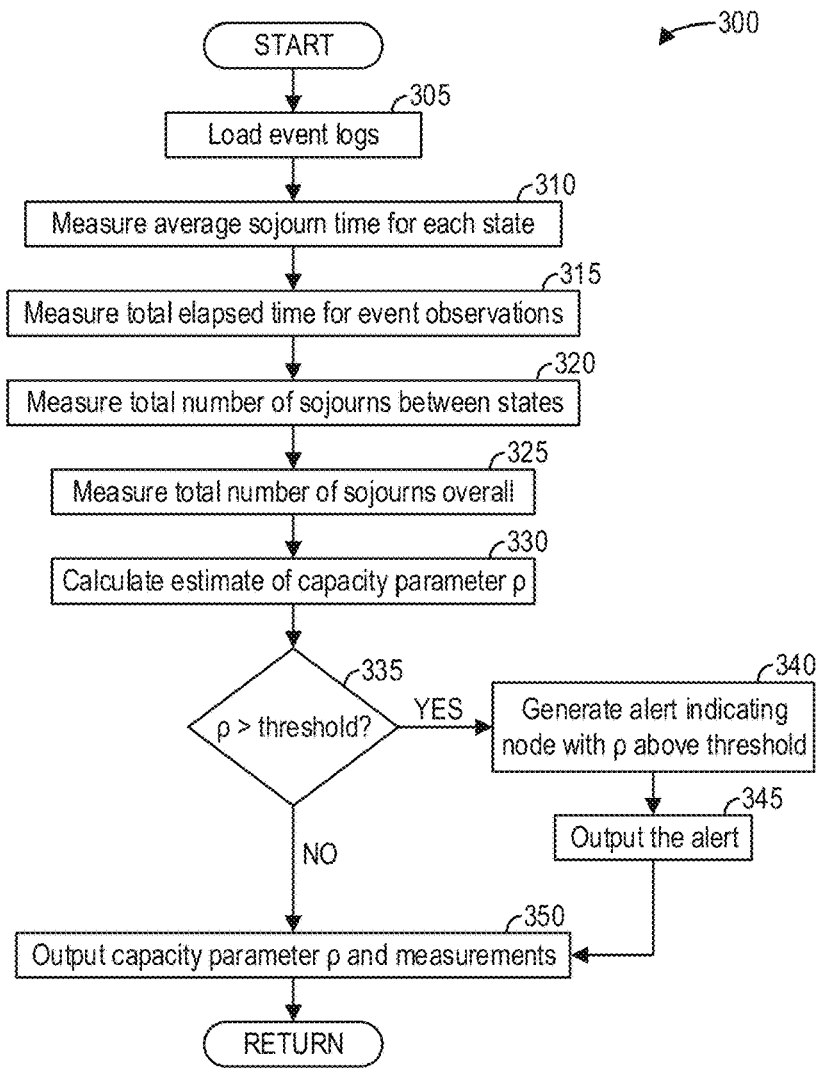
FIG. 3 shows a high-level flow chart illustrating an example method for estimating capacity from event logs according to an embodiment.

FIG. 3 shows a high-level flow chart illustrating an example method 300 for estimating capacity from event logs according to an embodiment. In particular, method 300 relates to rapidly estimating a capacity parameter based on queue time measurements extracted from event logs, and generating alerts of capacities above a threshold. Method 300 is described with regard to the systems and components of FIGS. 1 and 2, though it should be appreciated that the method 300 may be implemented with other systems and components without departing from the scope of the present disclosure. Method 300 may be implemented as executable instructions in non-transitory memory, such as memory 105, and executed by a processor, such as processor 104, to perform the actions described herein below. Method 300 may specifically be implemented as instructions in the capacity estimation module 220.

Method 300 begins at 305. At 305, method 300 loads event logs. The event logs may be loaded by the server 101, for example, from an external computing device or system via a network 120. Method 300 may load the event logs automatically, in some examples. For example, the event logs may be transmitted as they are generated, for example by one or more monitored systems 140, to the server 101. Additionally or alternatively, event logs may be aggregated for a given duration and then transmitted as a batch to the server 101. In additional or alternative examples, event logs may be aggregated in one or more databases, such as the event logs 155 in the plurality of databases 150, and automatically retrieved by the server 101 from the databases 150. In yet other examples, the event logs may be manually transmitted to the server 101. For example, a user of a client device 130 may submit a request for the server 101 to process a set of event logs 139 stored in the memory 135 of the client device 130, and the event logs 139 may be thus transmitted from the client device 130 to the server 101. The event logs may be loaded in any standard format, such as, but not limited to, an eXtensible Event Stream (XES) format, a Comma-Separated Values (CSV) format, and/or another eXtensible Markup Language (XML) and/or tabular format.

Each event log comprises a record of an event, and thus includes at least an identifier (Case ID) identifying a case in the log associated with the event, a start time indicating a date and a time for the event, and an activity corresponding to the event. Event logs thus indicate a current status of a case as well as historical progress of the case over time through a workflow.

At 310, method 300 measures the average transition time or average sojourn time for each activity from the event logs. For example, method 300 may determine the plurality of durations between sojourns between two activities from the event logs, and compute an average transition time from the plurality of durations. As another example, method 300 may measure the average transition time based on a Fourier analysis of the event logs, as described further herein with regard to FIG. 4. Continuing at 315, method 300 measures the total elapsed time for event observations. At 320, method 300 measures the total number of sojourns between activities. At 325, method 300 measures the total number of sojourns overall.

After extracting the measurements from the event logs, method 300 continues to 330. At 330, method 300 calculates an estimate of a capacity parameter ρ for each activity in the process. The capacity parameter ρ may be calculated as described hereinabove with regard to FIG. 2. For example, method 300 calculates the capacity parameter ρ according to the analytic expression provided hereinabove, wherein the parameters measured directly from the event logs as described hereinabove or measured from Fourier analysis of the event logs as described further herein below are used as input for calculating the capacity parameter ρ.

At 335, method 300 determines if the capacity parameter ρ is greater than a threshold. If the capacity parameter ρ is greater than the threshold for at least one activity ("YES"), method 300 continues to 340. At 340, method 300 generates an alert indicating the activity with the capacity parameter ρ above the threshold. At 345, method 300 outputs the alert. The alert may comprise an attention indicator 264 for graphically identifying the process and/or workflow activities in greatest need of attention. The alert may be implemented by any means generally used, for example, as a color coding, a shading, 3D models, and/or animation effects in the machine-readable two-dimensional process diagram, as illustrative examples. Method 300 then continues to 350.

However, referring again to 335, if the capacity parameter ρ is not greater than the threshold for any activities ("NO"), method 300 continues to 350. At 350, method 300 outputs the capacity parameter ρ and the measurements. Method 300 may then return.

Thus, a method comprises collecting event logs from monitoring systems communicatively coupled to a computing device, each event log indicating an event occurring at a given time at a given activity within a process, measuring transition times between activities of the process from the event logs, calculating, from the measured transition times, a capacity of an activity of the activities, and generating an alert indicating the activity approaching or at a maximum capacity of the activity responsive to the capacity above a threshold. It should be appreciated that while method 300 is directed to identifying activities wherein capacity is at or approaching an upper threshold, method 300 may be further adapted to identify activities wherein capacity is below a lower threshold. For example, if an activity in an operational process is consistently below the lower threshold, method 300 may generate an alert or otherwise indicate to the user that the activity is under-utilized such that the operational process may be adjusted to better utilize the capacity. To ensure that the activity is consistently below the lower threshold rather than only briefly below the lower threshold, method 300 may wait to generate an alert regarding the activity until method 300 determines that the activity is below the lower threshold for a threshold duration, wherein the threshold duration is pre-determined such that activities with capacities below the lower threshold for an amount of time greater than the threshold duration may be confidently considered to be under-utilized.

Figure 4:
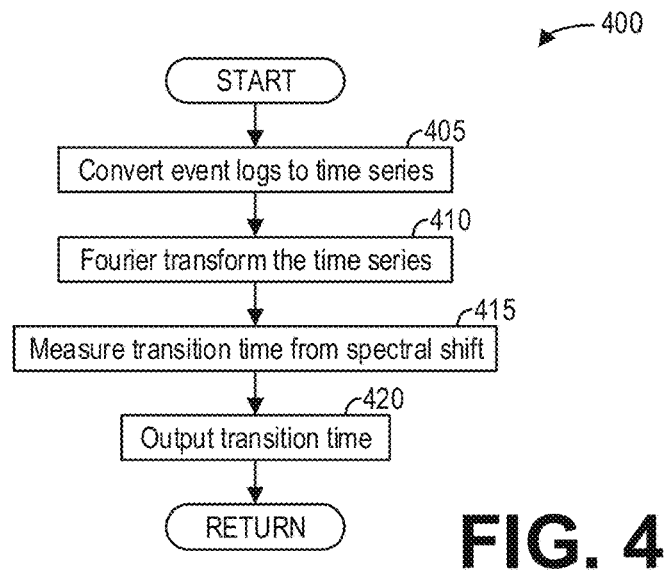
FIG. 4 shows a high-level flow chart illustrating an example method for measuring transition times between states from event logs according to an embodiment.

FIG. 4 shows a high-level flow chart illustrating an example method 400 for measuring transition times between activities from event logs according to an embodiment. In particular, method 400 relates to measuring transition times based on Fourier analysis of event logs. Method 400 is described with regard to the systems, components, and methods of FIGS. 1-3, though it should be appreciated that method 400 may be implemented with other systems, components, and methods without departing from the scope of the present disclosure. Method 400 may be implemented as executable instructions in the memory 105 of the server 101, for example, and executed by the processor 104 of the server 101. Method 400 may comprise a subroutine of method 300, in some examples, wherein method 400 comprises the action 310.

Method 400 begins at 405. At 405, method 400 converts the event logs to a time series representation. In the time series representation, the event logs correspond to a series of square waves describing an event being processed by an activity in the process diagram (or equivalently, an activity in the Markov transition matrix module 230).

At 410, method 400 applies a Fourier transformation to the time series. At 415, method 400 measures a transition time from spectral shifts in the spectral bandwidth of the Fourier representation of the time series. Since method 400 is analyzing spectral shifts, no assumptions regarding the number of workers at a given activity are necessary, thereby potentially improving the accuracy of the measurements of the capacity parameter. At 420, method 400 outputs the measured transition time. Method 400 then returns.

Figure 5:
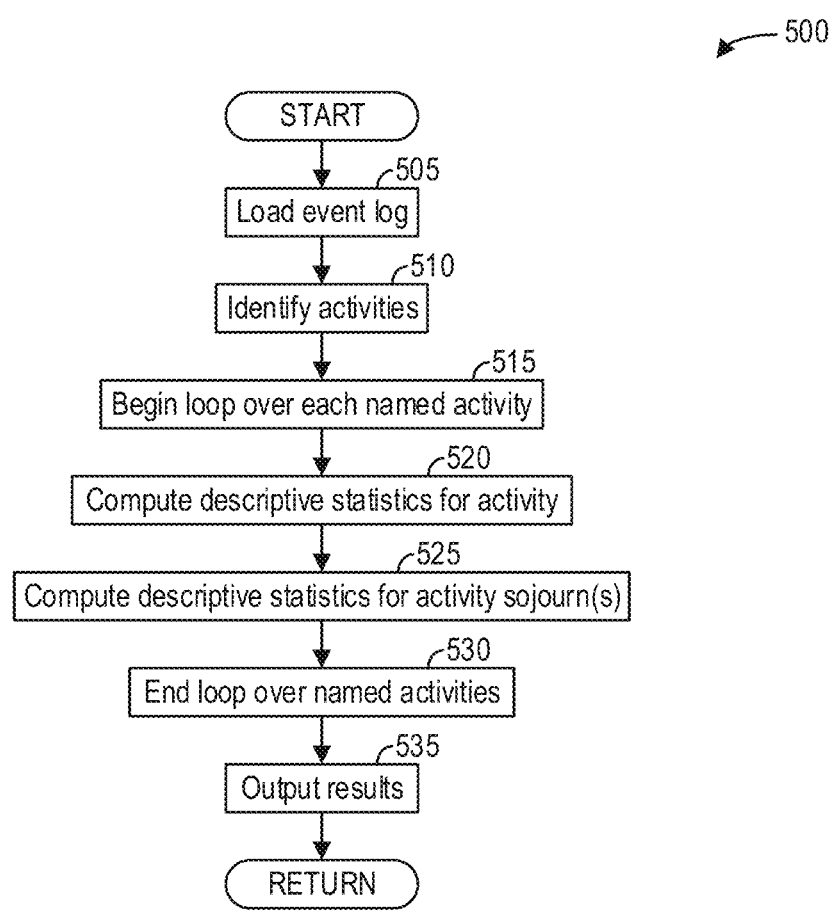
FIG. 5 shows a high-level flow chart illustrating an example method for basic analysis of event logs according to an embodiment.

FIG. 5 shows a high-level flow chart illustrating an example method 500 for basic analysis of event logs according to an embodiment. Method 500 is described with regard to the systems and components of FIGS. 1 and 2, though it should be appreciated that the method 500 may be implemented with other systems and components without departing from the scope of the present disclosure. In particular, method 500 relates to computing descriptive statistics from event logs with the event log analysis module 210 in general and the descriptive statistics module 215 in particular. Method 500 may thus be implemented as instructions in non-transitory memory 105 of the server 101 and may be executed by the processor 104 of the server 101.

At 505, method 500 loads an event log. At 510, method 500 identifies one or more activities in the event log. For example, method 600 may loop over an event array of the event log and identify each discrete named event activity (e.g., "concept:name" in the IEEE XES format).

At 515, method 500 begins looping over each named activity in the event log. That is, for each activity identified at 510 in the event log, method 500 performs the actions 520 and 525. For example, at 520, method 500 computes descriptive statistics for the activity. The descriptive statistics for the activity may include one or more of the average, median, skew, kurtosis, standard deviation, variance, mode, root mean square, and so on, in the linear and/or log scale. Further, at 525, method 500 computes descriptive statistics for the activity sojourns. Method 500 may in some examples execute a second loop at 525 for the activity being examined in the current loop. For example, method 500 may measure transition time between each named activity and the given activity, and may compute descriptive statistics for each sojourn including the average, median, skew, kurtosis, standard deviation, variance, mode, root mean square, and so on, in the linear and/or log scale. At 530, method 500 ends the loop(s) over the named activities. At 535, method 500 outputs the results. Method 500 then returns.

As method 500 is described hereinabove with regard to a single event log, it should be appreciated that method 500 may be executed for each event log in a plurality of event logs.

FIG. 6 shows a high-level flow chart illustrating an example method 600 for utilizing data extracted from event logs for automated workflow improvements according to an embodiment. Method 600 is described with regard to the systems and components of FIGS. 1 and 2, though it should be appreciated that the method 600 may be implemented with other systems and components without departing from the scope of the present disclosure. In particular, method 600 relates to processing event logs with one or more of the event log analysis module 210, the descriptive statistics module 215, the Markov transition matrix module 230, and the AI process improvement advisor module 250. Method 600 may thus be implemented as instructions in non-transitory memory 105 of the server 101 and may be executed by the processor 104 of the server 101.

Method 600 begins at 605. At 605, method 600 generates a diagram of the process flow from the event logs. For example, method 600 analyzes the event logs to determine one or more processes comprising a chain of activities within the event logs, and generates a graphical machine-readable two-dimensional process diagram such as a BPMN diagram.

At 610, method 600 generates a Markov transition matrix from the event logs. To that end, method 600 records event activity sojourn statistics such as the number of observed activity sojourns, the average time for each sojourn, and the total elapsed time during which sojourns are observed into the Markov transition matrix. At 615, method 600 calculates descriptive statistical characteristics of activity sojourn times from the Markov transition matrix. For example, method 600 calculates the kurtosis, skew, mean, variance, median, mode, and so on. Furthermore, method 600 similarly calculates descriptive statistics for each activity itself. At 620, method 600 classifies distributions of the activity sojourn times. For example, method 600 classifies distributions of the activity sojourn times with labels such as "normally distributed," "extreme value distribution," "uniform distribution," "Poisson distribution," "platykurtic normal distribution," and so on by applying heuristics to the statistical characteristics.

At 625, method 600 inputs one or more of the process flow diagram, the Markov transition matrix, the event log measurements, the estimate of capacity parameter, the classifications of the distributions, and the descriptive statistical characteristics of the activity sojourn times, the descriptive statistical characteristics of the wait times, and the descriptive statistical characteristics of the activity times to the AI process improvement advisor module 250. At 630, method 600 outputs the results from the AI process improvement advisor module. Method 600 then returns.

Thus, in addition to the capacity estimation described in the method 300 of FIG. 3, additional methods for using event logs to generate a machine-readable process diagram, and generate artificially-intelligent process improvement advice are provided.

Figure 7:
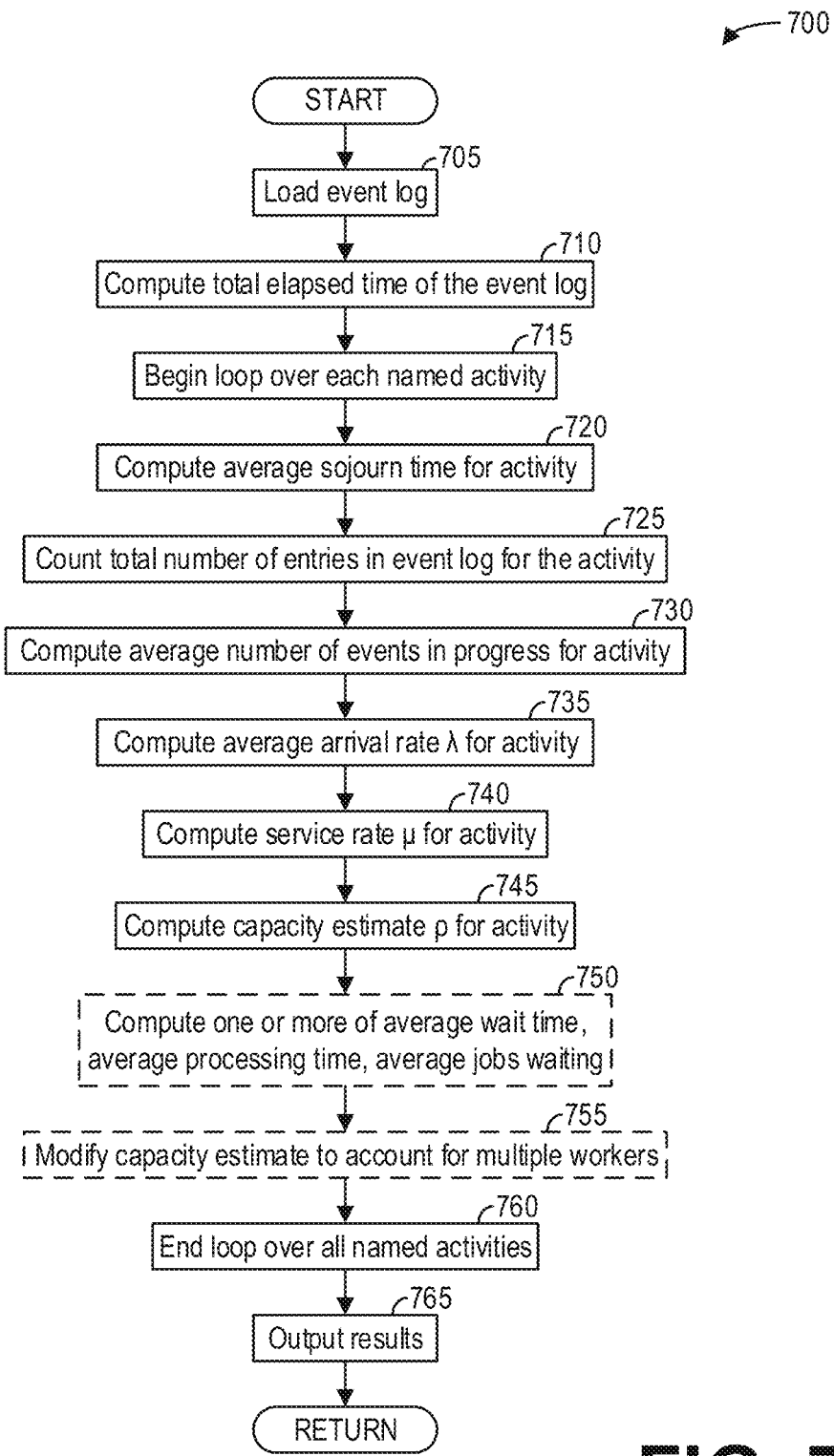
FIG. 7 shows a high-level flow chart illustrating another example method for estimating capacity according to an embodiment.

FIG. 7 shows a high-level flow chart illustrating another example method 700 for estimating capacity according to an embodiment. Method 700 is described with regard to the systems and components of FIGS. 1 and 2, though it should be appreciated that the method 700 may be implemented with other systems and components without departing from the scope of the present disclosure. In particular, method 700 relates to calculating one or more capacity estimates from event logs via the event log analysis module 210 in general, and the capacity estimation module 220 in particular. Method 700 may thus be implemented as instructions in non-transitory memory 105 of the server 101 and may be executed by the processor 104 of the server 101.

Method 700 begins at 705. At 705, method 700 loads an event log. At 710, method 700 computes a total elapsed time of the event log. For example, method 700 may loop over the event array of the event log and determine the maximum and minimum timestamps of any activity stored in the event log. The time between the maximum and minimum timestamps comprises the total elapsed time of the event log.

At 715, method 700 begins a loop over each named activity in the event log. At 720, method 700 computes average sojourn time for each activity. The sojourn time is the sum of the wait and service times. For each discretely-named event activity, method 700 loops over the event array of the event log and computes the average sojourn time for the named activity by determining the average sojourn time between complete records of previous activities of any name and complete records of the given named activity, if available. Otherwise, if there is no previous activity, method 700 determines an average sojourn time between a "start" record and complete records of the named activity.

At 725, method 700 counts a total number of entries in the event log for the activity. For example, method 700 may loop over the event array of the event log and count the total number of activities recorded in the event array that match the named activity.

At 730, method 700 computes an average number of in-progress events for the activity. The average number of in-progress events for the activity comprises the count for the named activity simultaneously in progress (either wait or service) over the course of the event log. To compute the average number of in-progress events for the activity, method 700 may divide the total count for the activity determined at 725 by the total elapsed time of the event log measured at 710.

At 735, method 700 computes the average arrival rate $\lambda$ for the activity. For example, method 700 may compute the average arrival rate $\lambda$ by calculating the average number of in-progress events for the activity determined at 730 by the average sojourn times for the activity determined at 720.

At 740, method 700 computes the service rate $\mu$ for the activity. As described hereinabove, method 700 may compute the service rate $\mu$ for the activity by adding the arrival rate $\lambda$ to the quantity one divided by the average sojourn times for the activity.

At 745, method 700 computes the capacity estimate $\rho$ for the activity. For example, as discussed hereinabove, method 700 may compute the capacity estimate $\rho$ by dividing the arrival rate $\lambda$ by the service rate $\mu$.

At 750, method 700 optionally computes one or more of an average wait time, an average service time, and average jobs waiting. Further, at 755, method 700 optionally modifies the capacity estimate ρ to account for multiple workers. For example, the capacity estimate ρ computed at 745 assumes one worker, which may be inaccurate in a strict quantitative sense but at least may be directionally correct. Method 700 may modify the capacity estimate ρ obtained above to achieve a more quantitatively accurate estimate of capacity. As one illustrative and non-limiting example, method 700 may modify ρ to account for multiple workers by dividing the capacity estimate ρ obtained at 745 by the average number of simultaneous workers which may be known or estimated.

At 760, method 700 ends the loop of the named activities, and at 765, method 700 outputs the results. Method 700 then returns.

FIG. 8 shows a high-level flow chart illustrating an example method 800 for using Fourier transformations to estimate capacity according to an embodiment. Method 800 is described with regard to the systems and components of FIGS. 1 and 2, though it should be appreciated that the method 800 may be implemented with other systems and components without departing from the scope of the present disclosure. In particular, method 800 relates to a Fourier-based technique for calculating one or more capacity estimates from event logs via the event log analysis module 210 in general, and the capacity estimation module 220 in particular. Method 800 may thus be implemented as instructions in non-transitory memory 105 of the server 101 and may be executed by the processor 104 of the server 101.

Method 800 begins at 805. At 805, method 800 loads an event log. At 810, method 800 begins a loop over each named activity. At 815, method 800 computes a square wave exit waveform in the amplitude domain for each activity. For example, method 800 converts the sojourns or transitions of the activity of interest into a square wave. The event log may include timestamps for the complete record of the preceding activity or the complete record of the activity of interest (or, if there is no preceding activity, a start record of the activity of interest may be provided). For example, each sojourn corresponds to a starting timestamp and an ending timestamp. These timestamps may be converted into a square wave, wherein the exit waveform is zero outside the sojourn and includes an amplitude of one within the timestamp range of the sojourns. The square waves of different sojourns are added together to produce an amplitude-domain time-series dataset. Method 800 may store the resulting dataset in an activity array entry for the activity in question.

At 820, method 800 computes an entry waveform in the amplitude domain for each activity. For example, for each activity of interest, method 800 locates the activity records of all activities that feed into the activity of interest, and determines the number of events from each of these activities that transitioned into the activity of interest. In some examples, this number of transitioning activities is stored in the Markov transition matrix module 230 as discussed above, and so method 800 may retrieve the number from the Markov transition matrix module 230. The entry waveform comprises the weighted sum of the exit waveforms of each preceding activity. For example, if activities A and B feed into activity C (as known from the Markov transition matrix module 230), where two-thirds of activity A feed into activity C and one-half of activity B feeds into activity C, then the entry waveform for activity C comprises two-thirds of the exit waveform for activity A plus one-half of the exit waveform for activity B.

At 825, method 800 computes a discrete Fourier transform of the entry waveform and the exit waveform for each activity. For example, method 800 may apply the fast Fourier transform (FFT) algorithm or the discrete Fourier transform (DFT) algorithm to the entry and exit waveforms. The resulting dataset from FFT is the same size as the input dataset, except the resulting dataset comprises waveforms in the frequency domain rather than the amplitude domain.

At 830, method 800 computes the spectral centroid of each entry and exit waveform in the frequency domain. Then, at 835, method 800 computes the fractional spectral downshift between the two waveforms. To compute the fractional spectral downshift, method 800 calculates the difference between the spectral centroid of the entry waveform and the spectral centroid of the exit waveform. Method 800 then divides the difference by the spectral centroid of the entry waveform to obtain the fractional spectral downshift. Typical values of the fractional spectral downshift may range from zero to one, though noise in the data may cause the downshift to exceed this range. In such cases, if the computed fractional spectral downshift is less than zero, method 800 sets the fractional spectral downshift to zero or a small number epsilon, whereas if the computed fractional spectral downshift is greater than one, method 800 sets the fractional spectral downshift to one or one minus the small number epsilon. In this way, the estimated fractional spectral downshift returned by method 800 always ranges between zero and one, regardless of data noise.

At 840, method 800 estimates the capacity for the activity from the fractional spectral downshift. For an activity close to full utilization, there will be a large spectral downshift, as high frequencies in the entry waveform will be eliminated due to the long wait times. At 100% capacity, high frequencies will almost be eliminated in the exit waveform. For an activity at 0% capacity, however, wait times will be non-existent, and the frequency distribution of the exit waveforms will be similar to entry waveforms. Consequently, method 800 may use the fractional spectral downshift as an estimate for capacity of the activity.

At 845, method 800 ends the loop over all the named activities. At 850, method 800 outputs the results. Method 800 then returns.

FIG. 9 shows a high-level flow chart illustrating an example method 900 for calculating Markov transitions according to an embodiment. Method 900 is described with regard to the systems and components of FIGS. 1 and 2, though it should be appreciated that the method 900 may be implemented with other systems and components without departing from the scope of the present disclosure. In particular, method 900 relates to calculating Markov transition probabilities from event logs via the event log analysis module 210 in general, and the Markov transition matrix module 230 in particular. Method 900 may thus be implemented as instructions in non-transitory memory 105 of the server 101 and may be executed by the processor 104 of the server 101.

Method 900 begins at 905. At 905, method 900 loads an event log. At 910, method 900 identifies activities in the event log. At 915, method 900 begins a loop over all the named activities. At 920, method 900 counts events for an activity in the named activities. That is, method 900 counts the number of times each activity occurs. At 925, method 900 begins a second loop. During the second loop, at 930, method 900 counts activity transitions. That is, method 900 counts the number of times the inner loop activities transition to outer loop activities. At 935, method 900 computes Markov transition probabilities. For example, method 900 may obtain the Markov transition probabilities by dividing the quantities from the preceding step (the number of activity transitions) by the number of events for the activity. Method 900 populates the Markov matrix with statistics for each transition activity, including the possibility for an activity to repeat itself. At 940, method 900 ends the loops. At 945, method 900 outputs the results. Method 900 then returns.

Figure 10:
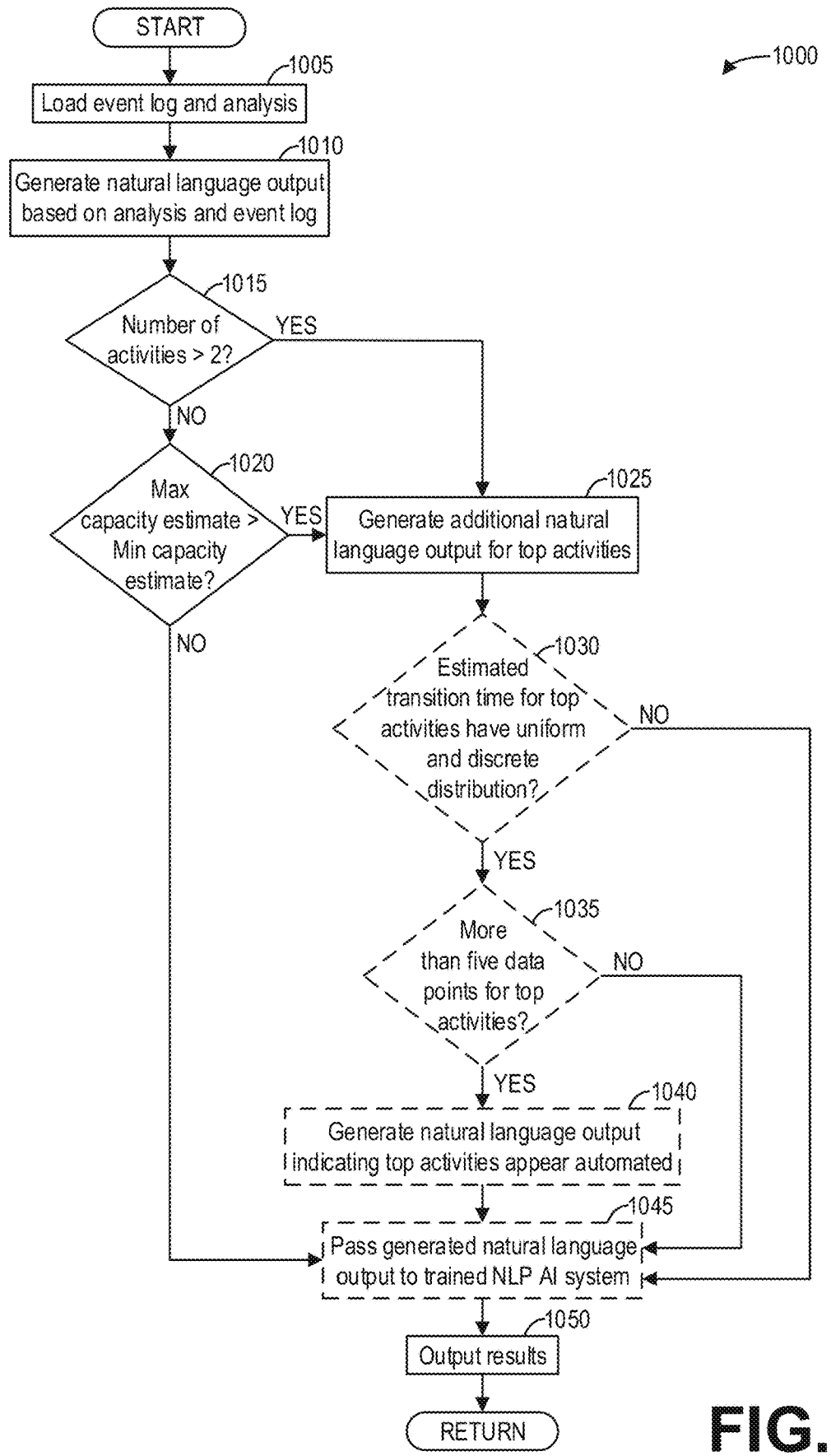
FIG. 10 shows a high-level flow chart illustrating an example method for a process improvement advisor according to an embodiment.

FIG. 10 shows a high-level flow chart illustrating an example method 1000 for a process improvement advisor according to an embodiment. Method 1000 is described with regard to the systems and components of FIGS. 1 and 2, though it should be appreciated that the method 1000 may be implemented with other systems and components without departing from the scope of the present disclosure. In particular, method 1000 relates to generating natural language explanations of the event logs via the event log analysis module 210 and/or the AI process improvement advisor module 250. Method 1000 may thus be implemented as instructions in non-transitory memory 105 of the server 101 and may be executed by the processor 104 of the server 101.

Method 1000 begins at 1005. At 1005, method 1000 loads an event log and an analysis of the event log. For example, method 1000 may load the descriptive statistics and process capacity estimates from the event log analysis module 210. At 1010, method 1000 generates a natural language output based on the analysis and the event log. For example, method 1000 may populate a natural language output with the descriptive statistics. As an illustrative and non-limiting example, the natural language output populated with descriptive statistics may read: "This process model was created by analyzing 665 cases. The average case time is 13.31 days, and the median case time is 10.03 days. The minimum case time is 3.68 minutes. The maximum case time is 82.82 days. It appears that the case durations are log normal skewed to the right. There were 10,476 total events processed. The activities which take the longest amount of time are 'underwriting' at 1.71 days and 'contract analysis' at 17.34 hours. There were an average of 30.28 events per case, and a median of 25 events per case. There were a maximum of 170 events per case and a minimum of 10. The most frequent events are 'request client meetings' at 1,942 observations and 'process new leads' at 1,942 observations [. . . ]." It should be appreciated that the numerical data and qualitative descriptions, as well as the particular natural language text, are illustrative and non-limiting.

At 1015, method 1000 determines whether the number of activities in the event log is greater than two. If the number of activities is greater than two ("YES"), method 1000 proceeds to 1025. However, if the number of activities is not greater than two ("NO"), method 1000 proceeds to 1020. At 1020, method 1000 determines whether the maximum capacity estimate is greater than the minimum capacity estimate. If the maximum capacity estimate is greater than the minimum capacity estimate ("YES"), method 1000 proceeds to 1025. However, if the maximum capacity estimate is not greater than the minimum capacity estimate ("NO"), method 1000 proceeds to 1045.

Thus, if there are not at least two activities with estimated capacity parameters, or if there is no difference between the maximum and minimum capacity estimates, there is likely insufficient data to provide comparative commentary on multiple activities, and so method 1000 continues to 1045.

However, if method 1000 determines that the number of activities is greater than two at 1015 or that the maximum capacity estimate is greater than the minimum capacity estimate at 1020, method 1000 continues to 1025. At 1025, method 1000 generates additional natural language output for the top activities. For example, method 1000 may generate additional natural language output for the activities with the two highest capacity estimates by looping over the capacity estimates and finding the two highest numeric estimates. Method 1000 then generates a natural language text string populated with data from the top two activities. For example, such a text string may read: "It appears the activities which are at the highest capacity are [Activity 1 Name] and [Activity 2 Name]." Method 1000 appends the text string to the natural language output generated at 1010. For example, for the example case provided above with regard to 1010, method 1000 may append the text string "It appears the activities which are at the highest capacity are 'legal review' and 'underwriting'" to the natural language output provided as an illustrative example above.

In some examples, method 1000 proceeds directly from 1025 to 1045. Optionally, method 1000 instead proceeds to 1030. At 1030, method 1000 optionally determines whether the estimated transition time for the top activities have uniform and discrete distribution. If the estimated transition time for the top two activities do not have a uniform and a discrete distribution ("NO"), method 1000 proceeds to 1045. However, if the estimated transition time for the top two activities have a uniform and discrete distribution ("YES"), method 1000 continues to 1035. At 1035, method 1000 optionally determines whether there are more than five data points for the top two activities. If there are not more than five data points for the top two activities ("NO"), method 1000 continues to 1045. However, if there are more than five data points for the top two activities ("YES"), method 1000 continues to 1040. At 1040, method 1000 optionally generates natural language output indicating that the top activities appear to be automated. That is, if the estimated transition time for the top activities has a uniform and discrete distribution, and there are more than five data points for the activities, then these activities may be automated. As such, method 1000 may append a text string that reads, for example: "The activity [Activity Name] has a high capacity estimate yet has a uniform or discrete distribution and thus appears to be the result of an automated process. Since this activity appears to be automated, it may be inexpensive to increase capacity of this activity." As an illustrative example in the example case discussed hereinabove with regard to 1010 and 1025, an activity "automated lead ingest" may feature a uniform or discrete distribution and thus may appear to be the result of an automated process. In this way, method 1000 provides a suggestion for improving the process by expanding capacity of automated processes.

At 1045, method 1000 optionally passes the generated natural language output to a trained natural language processing (NLP) artificial intelligence (AI) system. For example, method 1000 may pass the natural language output generated at 1010, 1025, and/or 1040 to a trained NLP AI system such as the system described hereinabove, or alternatively to another modern NLP AI system. The NLP AI system may re-write the NLP output generated above. For example, the NLP AI system may combine the NLP output in complex, programmatically-guided ways with other text input to add additional natural language text (e.g., from a business process improvement help corpus or natural language output from other, related modules), summarize the information, or ingest a large corpus of related facts (from, for example, a textbook or encyclopedia) to facilitate dynamic questions with the user on the NLP output and suggested next steps.

At 1050, method 1000 outputs the results. The results may comprise the natural language output generated at one or more of 1010, 1025, and 1040. Additionally or alternatively, the results may comprise the output of the NLP AI system at 1045. Method 1000 then returns.

It should be appreciated that the method 1000 described hereinabove is illustrative and non-limiting, and that additional actions regarding generating additional natural language output according to various different parameters (aside from or in addition to the relation between the maximum capacity estimate and the minimum capacity estimate), for example, may be implemented without departing from the scope of the present disclosure.

It should be appreciated that the methods and systems as described herein broadly refer to processes or workflows, as the systems and methods disclosed herein provide substantial advantages over previous approaches in the technical field of process mining and process improvement. As one demonstration of how the methods and systems described herein may be applied to a particular workflow, FIGS. 11-13 depict results of the systems and methods described herein. As an illustrative example, event logs for a repair shop were provided to a system for analyzing event logs as described hereinabove. FIG. 11 shows a graph 1100 illustrating example estimations of capacity from such event logs. The estimations of the capacity parameter are provided in a tabular format, and individual cells of the graph are shaded according to the capacity parameter, with darker shades indicating an activity that is approaching or at capacity and lighter shades indicating an activity that are not under stress. As depicted, the "Analyze Defect" activity of the repair shop workflow is at or approaching capacity, especially in contrast with the "Archive Repair" and "Inform User" activities. Similarly, the capacity of the "Test Repair" activity is notably high, while the "Repair (Complex)" and "Repair (Simple)" activities are high but still within a reasonable range. By rapidly calculating such capacity parameters automatically from event logs, these potential bottlenecks in the operational process of a repair shop may be identified and actions may be taken to improve the capacity of the particular activities so that the overall throughput can be increased.

As another illustrative example, event logs from a call center were provided to a system for analyzing event logs as described hereinabove. FIG. 12 shows a table 1200 illustrating example classifications of statistical distributions measured from the call center event logs, generated for example by the event log analysis module 210. FIG. 13 shows an example diagram 1300 of a workflow process extracted from the call center event logs and generated, for example, by the event log analysis module 210.

A technical effect of the present disclosure includes the generation of an alert in real-time of an element of a workflow at low capacity and/or approaching capacity. Another technical effect of the present disclosure includes the automatic generation of a natural language recommendation of adjustments or improvements to a workflow.

In one embodiment, a method comprises collecting event logs from monitoring systems communicatively coupled to a computing device, each event log indicating an event occurring at a given time at a given activity within a process, measuring transition times between activities of the process from the event logs, calculating a capacity of an activity of the activities from the measured transition times, and generating an alert indicating the activity approaching or at a maximum capacity of the activity responsive to the capacity above a threshold.

In a first example of the method, the method further comprises converting the event logs into a time series, Fourier transforming the time series, measuring shifts in spectral bandwidth in the Fourier-transformed time series, and identifying the shifts as the transition times. In a second example of the method optionally including the first example, generating the alert comprises generating a graphical indication of the activity approaching or at the maximum capacity, and transmitting the graphical indication to a client device communicatively coupled to the server. In a third example of the method optionally including one or more of the first and second examples, generating the alert comprises generating, with an artificially-intelligent chatbot, a natural language statement indicating the activity is approaching or at capacity, and transmitting the natural language statement to a client device communicatively coupled to the server. In a fourth example of the method optionally including one or more of the first through third examples, the method further comprises automatically deriving a model of the process from the event logs. In a fifth example of the method optionally including one or more of the first through fourth examples, the method further comprises automatically adjusting the model of the process based on the capacity of the activity. In a sixth example of the method optionally including one or more of the first through fifth examples, the method further comprises transmitting a graphical two-dimensional representation of the model to a client device communicatively coupled to a server. In a seventh example of the method optionally including one or more of the first through sixth examples, the method further comprises measuring a total elapsed time for event observations, a total number of sojourns between activities, and a total number of sojourns overall from the event logs, wherein the sojourn times comprise an average transition time, and wherein the capacity is further calculated based on the total elapsed time, the total number of sojourns between activities, and the total number of sojourns overall. In an eighth example of the method optionally including one or more of the first through seventh examples, calculating the capacity of the activity comprises estimating the capacity from an average arrival rate determined from the total elapsed time, the total number of sojourns between activities, and the total number of sojourns overall, multiplied by an average service time determined from the average arrival rate and the average transition time.

In another embodiment, a system comprises a plurality of monitoring systems generating event logs, each event log indicating an event occurring at a given time at a given activity within a process, and a computing device communicatively coupled to the plurality of monitoring systems, the computing device comprising a processor a non-transitory memory storing instructions that when executed cause the processor to: load the event logs from the plurality of monitoring systems; measure transition times between activities of the process from the event logs; calculate a capacity of an activity of the process from the measured transition times; and generate an alert of the activity approaching or at a maximum capacity responsive to the capacity above a threshold.

In a first example of the system, the instructions when executed further cause the processor to convert the event logs into a time series, Fourier transform the time series, measure shifts in spectral bandwidth in the Fourier-transformed time series, and identify the shifts as the transition times. In a second example of the system optionally including the first example, generating the alert comprises generating a graphical indication of the activity approaching or at the maximum capacity, and transmitting the graphical indication to a client device communicatively coupled to the computing device. In a third example of the system optionally including one or more of the first and second examples, generating the alert comprises generating, with an artificially-intelligent chatbot, a natural language statement indicating the activity is approaching or at capacity, and transmitting the natural language statement to a client device communicatively coupled to the computing device. In a fourth example of the system optionally including one or more of the first through third examples, the instructions when executed further cause the processor to measure a total elapsed time for event observations, a total number of sojourns between activities, and a total number of sojourns overall from the event logs, wherein the transition times comprises an average transition time, and wherein the capacity is further calculated based on the total elapsed time, the total number of sojourns between activities, and the total number of sojourns overall. In a fifth example of the system optionally including one or more of the first through fourth examples, the instructions when executed further cause the processor to automatically derive a model of the process from the event logs. In a sixth example of the system optionally including one or more of the first through fifth examples, the instructions when executed further cause the processor to automatically adjust the model of the process based on the capacity of the activity. In a seventh example of the system optionally including one or more of the first through sixth examples, the instructions when executed further cause the processor to adjust an operation of one or more of the monitored systems based on the capacity.

In yet another embodiment, a computer-readable storage medium including an executable program stored thereon, the program configured to cause a processor to load event logs received from monitoring systems communicatively coupled to the processor, each event log indicating an event occurring at a given time at a given activity within a process, measure transition times between activities of the process from the event logs, calculate, from the measured transition times, a capacity of an activity of the activities, and generate an alert indicating the activity approaching or at a maximum capacity of the activity responsive to the capacity above a threshold.

In a first example of the computer-readable storage medium, the program is further configured to cause the processor to: convert the event logs into a time series, Fourier transform the time series, measure shifts in spectral bandwidth in the Fourier-transformed time series, and identify the shifts as the transition times. In a second example of the computer-readable storage medium optionally including the first example, the program is further configured to cause the processor to: automatically derive a model of the process from the event logs, and adjust the model based on the capacity.

Those having skill in the art will appreciate that there are various logic implementations by which processes and/or systems described herein can be affected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuits forming a communications device. (e.g., a modem, communications switch, or the like)

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, are also regarded as included within the subject matter of the present disclosure.

The invention claimed is:

1. A method, comprising:
   collecting event logs from monitoring systems communicatively coupled to a computing device, each event log indicating an event occurring at a given time at a given activity within an operational process;
   measuring transition times between activities of the operational process from the event logs for a plurality of users;
   calculating, from the measured transition times, a capacity of each activity of the activities; and
   generating an alert indicating an activity approaching or at a maximum capacity of the activity responsive to the capacity of the activity above a threshold;
   wherein measuring the transition times between the activities of the operational process from the event logs comprises measuring a plurality of transition times for the activity and calculating an average transition time for the activity from the plurality of transition times; and
   wherein capacity is calculated using a fractional spectral downshift between two waveforms or evaluating Fourier coefficient magnitude values.

2. The method of claim 1, further comprising calculating an average service time based on the average transition time, and calculating the capacity of the activity based on an average arrival rate and the average service time.

3. The method of claim 2, further comprising measuring a total elapsed time for event observations, a total number of sojourns between activities, and a total number of sojourns overall from the event logs, and calculating the average arrival rate based on the total elapsed time, the total number of sojourns between activities, and the total number of sojourns overall.

4. The method of claim 1, wherein generating the alert comprises generating a graphical indication of the activity approaching or at the maximum capacity, and transmitting the graphical indication to a client device communicatively coupled to a server.

5. The method of claim 1, wherein generating the alert comprises generating, with an artificially-intelligent chatbot, a natural language statement indicating the activity is approaching or at capacity, and transmitting the natural language statement to a client device communicatively coupled to a server.

6. The method of claim 1, further comprising automatically deriving a model of the operational process from the event logs.

7. The method of claim 6, further comprising automatically adjusting the model of the operational process based on the capacity of the activity.

8. The method of claim 7, further comprising transmitting a graphical two-dimensional representation of the model to a client device communicatively coupled to a server.

9. A system, comprising:
   a plurality of monitoring systems generating event logs, each event log indicating an event occurring at a given time at a given activity within an operational process; and
   a computing device communicatively coupled to the plurality of monitoring systems, the computing device comprising a processor a non-transitory memory storing instructions that when executed cause the processor to:
   load the event logs received from the plurality of monitoring systems;
   measure transition times between activities of the operational process from the event logs;
   calculate a capacity of an activity of the operational process from the measured transition times, wherein capacity is calculated using a fractional spectral downshift between two waveforms or evaluating Fourier coefficient magnitude values; and
   generate an alert of the activity approaching or at a maximum capacity responsive to the capacity above a threshold;
   wherein measuring the transition times between the activities of the operational process from the event logs comprises measuring a plurality of transition times for the activity and calculating an average transition time for the activity from the plurality of transition times.

10. The system of claim 9, wherein the instructions when executed further cause the processor to calculate an average service time based on the average transition time, and calculate the capacity of the activity based on an average arrival rate and the average service time.

11. The system of claim 10, wherein the instructions when executed further cause the processor to measure a total elapsed time for event observations, a total number of sojourns between activities, and a total number of sojourns overall from the event logs, and calculate the average arrival rate based on the total elapsed time, the total number of sojourns between activities, and the total number of sojourns overall.

12. The system of claim 9, wherein generating the alert comprises generating a graphical indication of the activity approaching or at the maximum capacity, and transmitting the graphical indication to a client device communicatively coupled to the computing device.

13. The system of claim 9, wherein the instructions when executed further cause the processor to automatically derive a model of the operational process from the event logs.

14. The system of claim 13, wherein the instructions when executed further cause the processor to automatically adjust the model of the operational process based on the capacity of the activity.

15. The system of claim 9, wherein the instructions when executed further cause the processor to adjust an operation of one or more of the monitored systems based on the capacity.

16. A non-transitory computer-readable storage medium including an executable program stored thereon, the program configured to cause a processor to:
- load event logs received from monitoring systems communicatively coupled to the processor, each event log indicating an event occurring at a given time at a given activity within an operational process;
- measure transition times between activities of the operational process from the event logs;
- calculate, from the measured transition times, an operational process capacity of an activity of the activities;
- generate a Markov transition matrix from the event logs;
- calculate an exit waveform from the Markov transition matrix and obtain a fraction spectral downshift; and
- generate an alert indicating the activity approaching or at a maximum process capacity of the activity responsive to the operational process capacity above a threshold.

17. The non-transitory computer-readable storage medium of claim 16, wherein the program is further configured to cause the processor to: calculate an average service time based on the measured transition times, and calculate the operational process capacity of the activity based on an average arrival rate and the average service time.

18. The non-transitory computer-readable storage medium of claim 16, wherein the program is further configured to cause the processor to: automatically derive a model of the operational process from the event logs, and adjust the model based on the operational process capacity.

* * * * *